United States Patent
An et al.

(10) Patent No.: US 11,852,186 B1
(45) Date of Patent: Dec. 26, 2023

(54) DIAL CAM LATCH

(71) Applicant: ZT Group Int'l, Inc., Secaucus, NJ (US)

(72) Inventors: Chen An, Bergenfield, NJ (US); Maheshkumar Varrey, Rutherford, NJ (US); Zichun Song, Bergenfield, NJ (US)

(73) Assignee: ZT Group Int'l, Inc., Secaucus, NJ (US)

( * ) Notice: Subject to any disclaimer, the term of this patent is extended or adjusted under 35 U.S.C. 154(b) by 782 days.

(21) Appl. No.: 16/891,408

(22) Filed: Jun. 3, 2020

(51) Int. Cl.
*F16B 5/06* (2006.01)

(52) U.S. Cl.
CPC .................. *F16B 5/06* (2013.01)

(58) Field of Classification Search
CPC . F16B 5/06; G06F 1/183; G06F 1/185; G06F 1/186; G06F 1/187; H05K 7/1487; H05K 7/1489; H05K 5/0221
See application file for complete search history.

(56) References Cited

U.S. PATENT DOCUMENTS

| | | | |
|---|---|---|---|
| 3,084,671 A * | 4/1963 | Dottlinger | B43K 24/084 401/111 |
| 5,725,324 A * | 3/1998 | Pavelski | G06F 1/183 312/334.44 |
| 6,370,022 B1 * | 4/2002 | Hooper | G06F 1/184 361/679.33 |
| 6,373,707 B1 * | 4/2002 | Hutchins | G06F 1/183 211/41.17 |
| 8,096,627 B2 * | 1/2012 | Lin | E05B 65/006 312/325 |
| 8,570,751 B2 * | 10/2013 | Zhou | G06F 1/183 361/725 |
| 8,717,764 B2 * | 5/2014 | Sun | F04D 25/00 361/679.48 |
| 10,376,054 B1 * | 8/2019 | Chen | A47B 88/50 |
| 10,753,387 B2 * | 8/2020 | Sundberg | F16C 11/069 |
| 11,419,229 B1 * | 8/2022 | An | H05K 7/1489 |
| 11,449,111 B2 * | 9/2022 | Buddrius | H01L 23/4006 |
| 2013/0149168 A1 * | 6/2013 | Sun | H05K 7/20172 416/244 R |
| 2013/0162131 A1 * | 6/2013 | Zhou | G06F 1/187 312/304 |

* cited by examiner

*Primary Examiner* — Matthew R McMahon
(74) *Attorney, Agent, or Firm* — Dergosits & Noah LLP; Todd A. Noah

(57) ABSTRACT

An apparatus provides a latch with a rotary dial and a leaf spring with teeth that extend from a frame into an engaging position. Inward axial movement of the dial causes the dial to deform the leaf spring and the teeth to extend into the engaging position. In the engaging position, the dial supports the teeth and resists forces that might otherwise cause the teeth to unlatch. In the engaging position, a catch in a track on the dial engages a pin of the frame to maintain the engaging position. From the engaging position, a rotation of the dial unseats the catch and allows the dial to move axially outward and the teeth to recede into the frame.

13 Claims, 7 Drawing Sheets

DIAL CAM LATCH

BACKGROUND

Existing latches for securing electronic components, e.g., solid state drives (SSD), within a chassis may not be durable, or may occupy more space in the chassis than is desirable, or both. Typical solutions available in the current market have made a hook and a spring from the same piece of sheet metal, which is both thin and sharp and may fatigue in time.

Thus, what is needed is a latch that can firmly secure the electronic component within a chassis and that also occupies as little space as possible. A further desired feature is that the latch is relatively easy to open and close.

BRIEF DESCRIPTION OF THE DRAWINGS

The embodiments are illustrated by way of example and not limitation in the accompanying drawings, in which like references indicate similar elements, and in which.

DETAILED DESCRIPTION

Embodiments described within disclose a latch that can firmly secure an electronic component within a chassis and that also occupies a relatively small space. In embodiments, a latch may use axial movement of spring-loaded dial wheel to urge a tooth or teeth on a leaf spring to move radially between engaging and dis-engaged positions. In these embodiments, a track (i.e., a groove, or cam) on the dial wheel may follow a pin anchored to the latch frame. The track may have a catch that engages the guide pin to retain the dial in a retracted position, which supports the teeth in the engaging position.

Figure 1A:
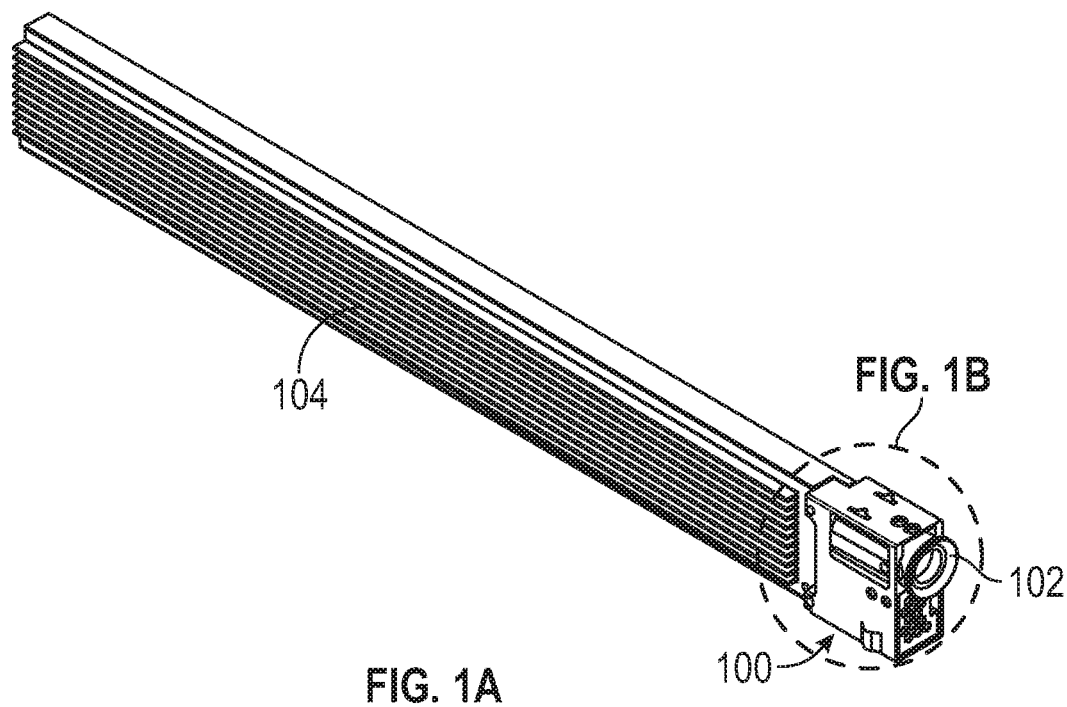
FIG. 1A is an upper right-side perspective view of an embodiment of a latch attached to an exemplary electronics component, i.e., a solid state drive (SSD)

FIG. 1A is an upper right-side perspective view of an embodiment of a latch 100 with a dial 102 and attached at the proximal end of an exemplary electronic component, in this case a solid state drive (SSD) 104. Not shown is an electrical connection at the end of SSD 104 distal to latch 100.

Figure 1B:
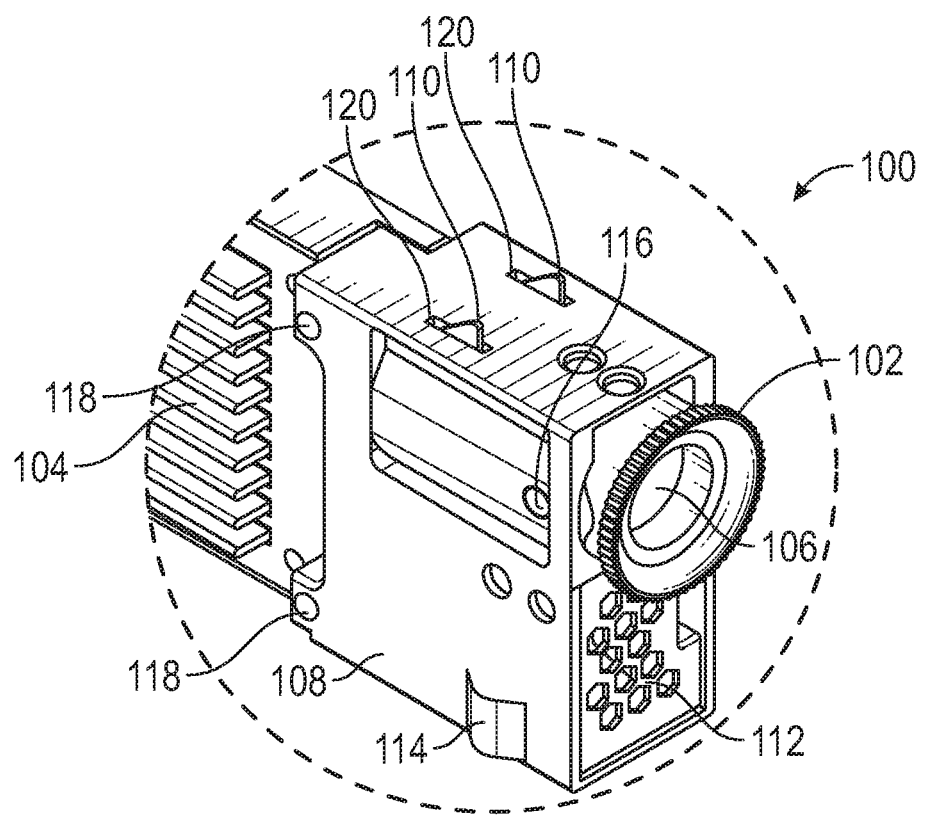
FIG. 1B is an enlarged view of the indicated section of FIG. 1A.
Figure 3:
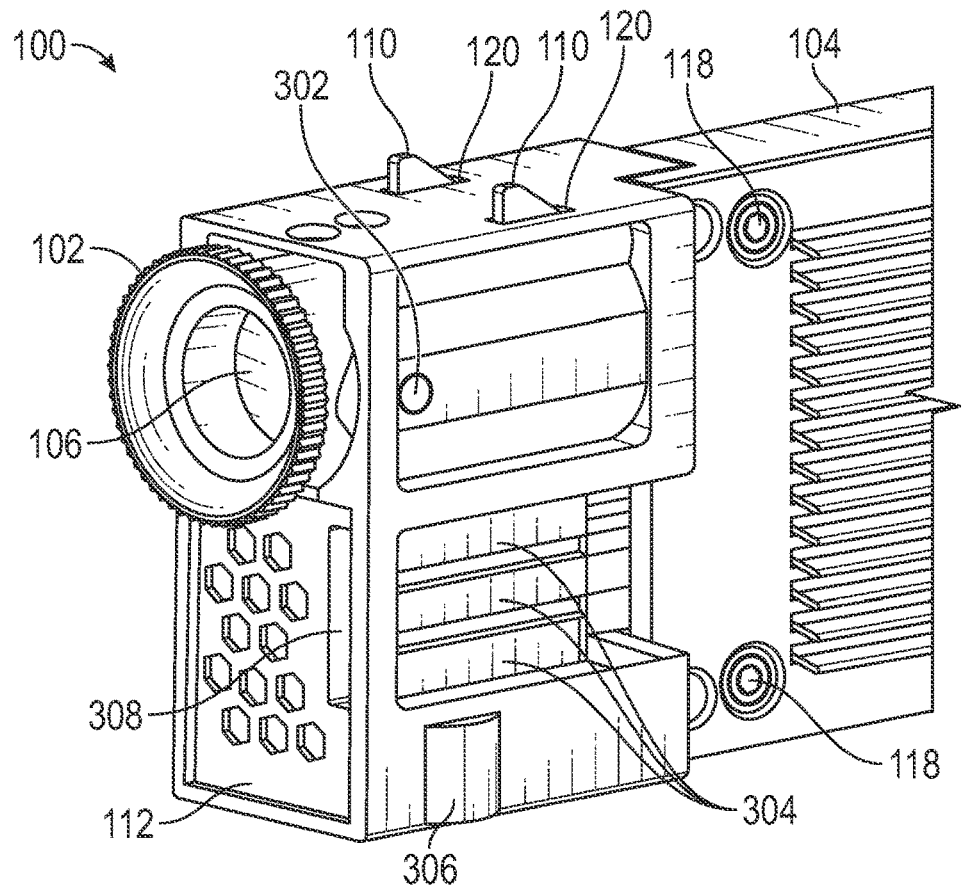
FIG. 3 is an upper left-side perspective view of the embodiment of FIG. 1A attached to an SSD.

FIG. 1B is an enlarged view of the indicated section of FIG. 1A. In FIG. 1B, latch 100 includes a dial 102 secured to a latch frame (or housing) 108 with a shoulder screw 106. Dial 102 may both pivot about shoulder screw 106 and travel axially with respect to screw 106. In both pivoting and travelling axially, dial 102 is guided by a pins 116, 302 (FIG. 3). Pin 116 follows a groove (408, FIG. 5A) in the side of dial 102. Pin 302 follows a track identical to track 408, but on the opposing side of dial 102. Latch 100 also includes one or more teeth (or "hooks") 110 that protrude from frame 108 through slots 120 to the engaging position shown in FIG. 1B. In embodiments, latch 100 may also include a grate 112 and an electro-magnetic interference (EMI) spring 114. Grate 112 is shown perforated to allow cooling air to flow through frame 108. EMI spring 114 contacts adjacent SSDs or chassis elements to provide a ground path and reduce the potential of damage due to static-electric discharges. In the engaging position as shown in FIG. 1B, teeth 110 are extended from frame 108 and may engage a chassis edge with the vertical (right-side as shown) edge of the tooth to hinder movement of the assembly of SSD 104 to the right (as shown). Frame 108 may be attached to the exemplary electronic component, SSD 104, using fasteners 118.

One of skill will realize that in embodiments, shoulder screw 106 may be replaced by a different fastening mechanism that allows dial 102 to rotate about the axis and travel axially. For example, shoulder screw may generally be considered a projection with a retaining cap.

Figure 2:
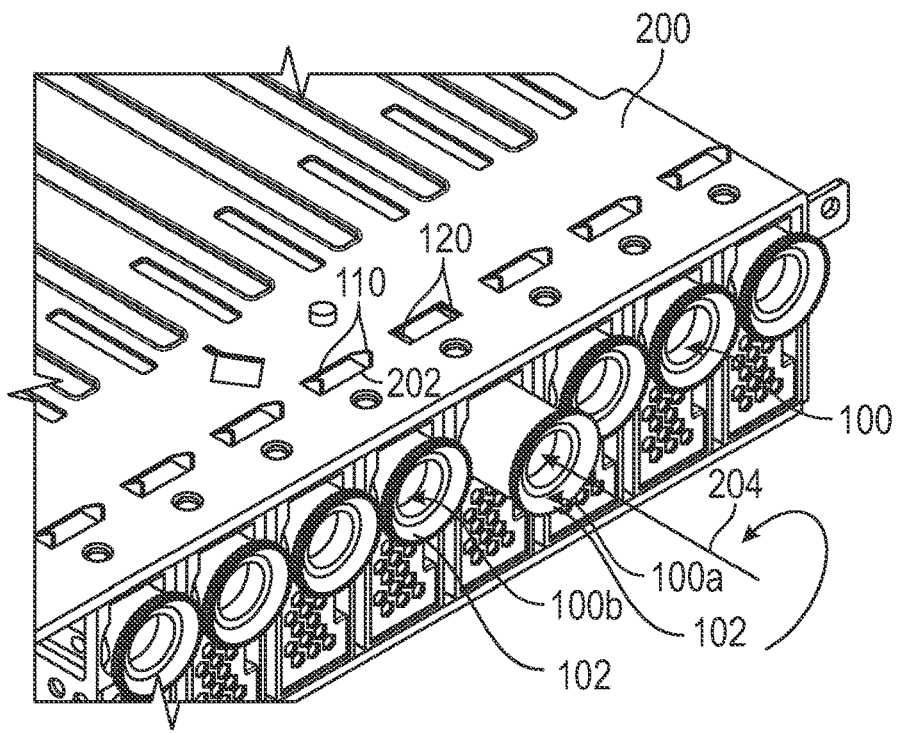
FIG. 2 is an upper right-side perspective view of the embodiment of FIG. 1A and associated SSDs in an exemplary use case.

FIG. 2 is an upper right-side perspective view of the embodiment of FIG. 1A and associated SSDs in an exemplary use case. In FIG. 2, multiple latches 100 are shown securing multiple SSDs within a chassis 200 with teeth 110 extending through slots 120 (of frame 108) and engaging edges of windows 202. FIG. 2 illustrates an unlatched (or "open") latch 100a and a latched (or "closed") latch 100b. Open latch 100a is shown with teeth 110 recessed below slots 120 such that teeth 110 no longer engage window 202. In the unlatched state, latch 100a does not hinder its removal from chassis 200. In contrast, closed latch 100b is shown with teeth 110 extended through slots 120 such that the vertical edges of teeth 110 engage window 202. In the latched state, latch 100b hinders its removal from chassis 200. With latch 100a, dial 102 is shown extended in comparison to dial 102 of latch 100b. As will be discussed within, the extension allows for the retraction of teeth 110. In addition, each dial 100 may be partly rotated about an axis 204, as indicted for latch 100a. As will be discussed, such rotation allows for pin 116 to be unseated from a catch (524, FIG. 5C) and for dial 102 to extend from chassis 200.

FIG. 3 is an upper left-side perspective view of latch 100 attached to the exemplary electronic component, SSD 104. In FIG. 3, latch 100 includes second guide pin 302 disposed in frame 108 across dial 102 from guide pin 116 (FIG. 1). Similarly, an EMI spring 306 contacts adjacent SSDs on this side of latch 100. In embodiments, latch 100 may include light pipes 304 for allowing indicators from SSD 104 to be displayed in a light pipe viewing opening 308 of grate 112.

Figure 4:
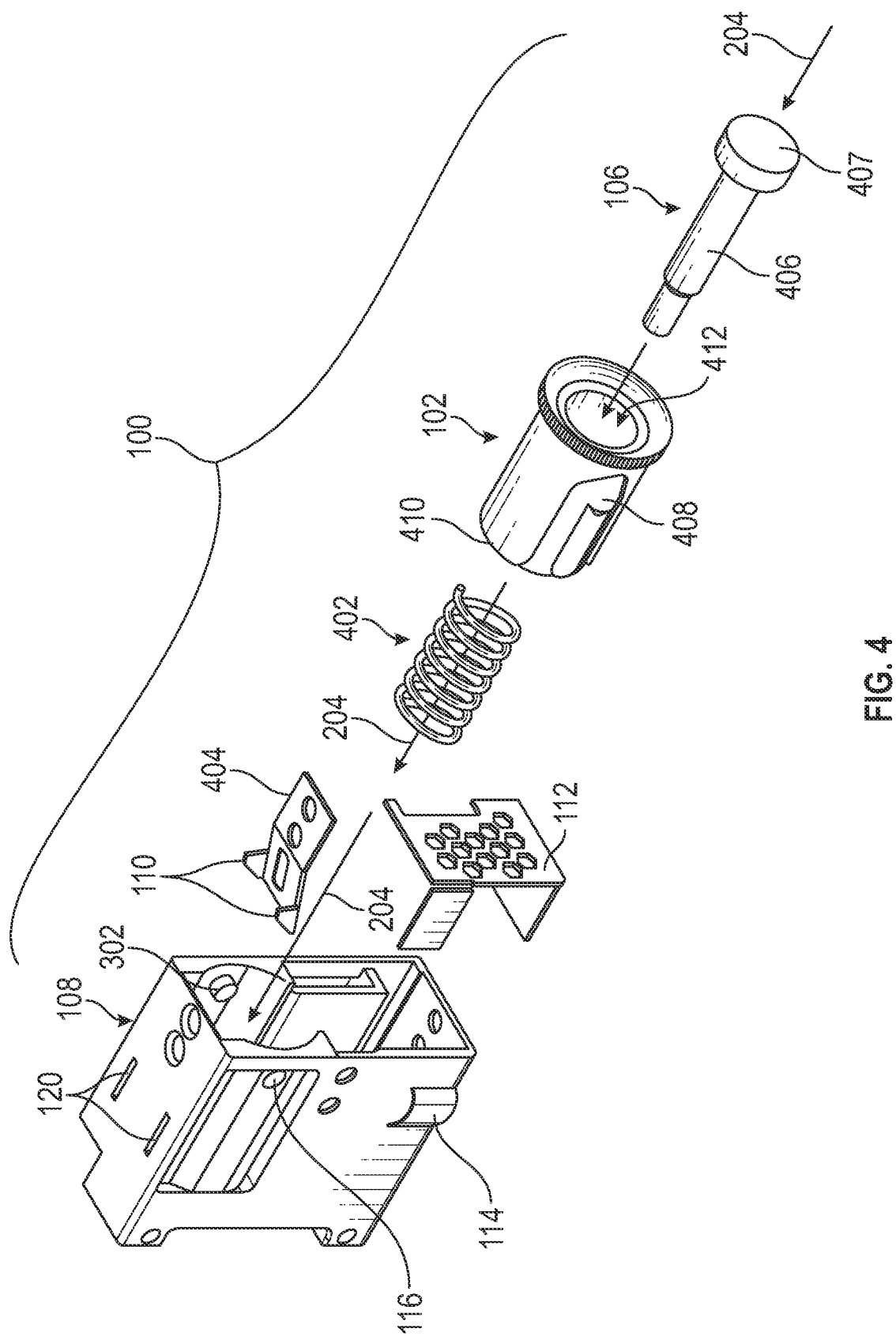
FIG. 4 is an assembly drawing of the embodiment of FIG. 1A.

FIG. 4 is an assembly drawing of the embodiment of FIG. 1A. In FIG. 4, latch 100 is shown to further include a coil spring 402 disposed about shoulder screw 106 and between dial 102 and frame 108. Teeth 110 are shown to be attached to a leaf spring 404 that is attached to frame 108, below the upper surface. Shoulder screw 106 secures dial 102 to frame 108. Dial 102 is shown to have a track 408. Shoulder screw 106 is shown to have a shaft 406 about which dial 102 may rotate and move axially. Coil spring 402, being positioned between dial 102 and frame 108 is compressed when dial 102 is pushed from the extended position (shown by latch 100a, FIG. 2) to the retracted position (shown by latch 100b, FIG. 2). Thus, coil spring 402 urges dial 102 to the extended position. Leaf spring 404 is shown to have two sections. In a first section, two holes indicate where the first section may be attached to frame 108. A second section of leaf spring 404 is joined to teeth 110. With leaf spring 404 in the relaxed state shown, the second section is shown to be at an angle to the first section. Thus, when leaf spring 404 is joined to frame 108 and dial 102 is extended, such that dial 102 does not contact the second section of leaf spring 404, leaf spring 404 is in the relaxed state and teeth 110 are recessed within slots 120. Thus, teeth 110 are in the open (or unlatched, or disengaged) position when leaf spring 404 is in the relaxed state. Shaft 406, about which dial 102 may rotate and move axially along axis 204, is shown to have a cap 407. Cap 407 works against a dial base 410 and moves within a dial socket 412, which keeps dial 102 attached to frame 108 while allowing rotation and axial movement. Track 408 of dial 102 engages guide pin 116 of frame 108. Pin 302 similarly engages a track (not shown) on the other side of dial 102 from track 408 and identical to track 408. When assembled, dial 102 is at least partially within frame 108 and pins 116, 302 move within their respective tracks. Thus, when assembled, dial 102 may be moved between an extended position, limited by the cap of shoulder screw 106 and a retracted position limited by the position of pins 116, 302 within their respective tracks, as will be discussed further with respect to FIG. 5A-FIG. 5H.

Figure 5A:
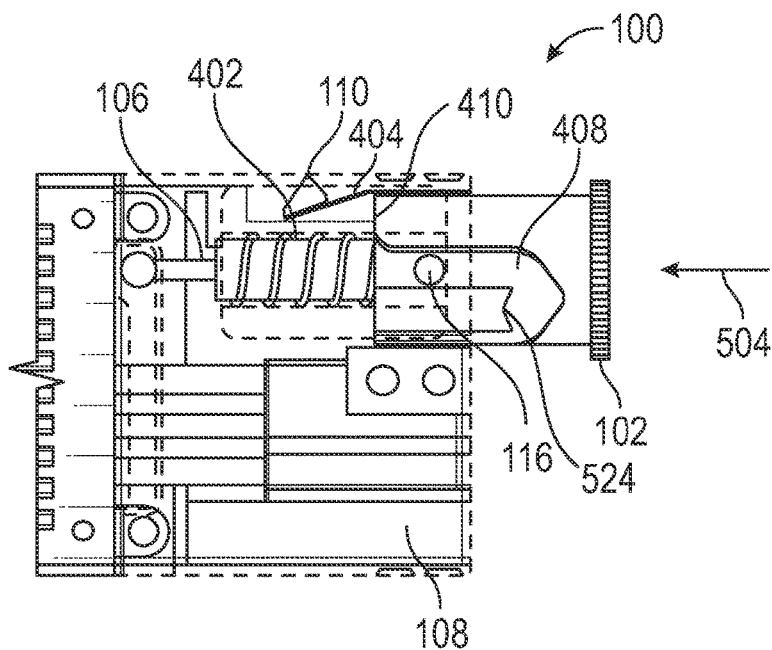
FIG. 5A is a partially-transparent right-side view of the embodiment of FIG. 1A in an unlatched state and illustrating a manipulation of the embodiment.

FIG. 5A is a partially-transparent right-side view of latch 100 in an unlatched state and illustrating a manipulation of the embodiment. In FIG. 5A, dial 102 is extended from frame 108 enough that no part of the curved extension of dial 102 contacts the angled section of leaf spring 404. Thus, leaf spring 404 is in the relaxed state and teeth 110 are shown to be retracted—not extending above the surface of frame 108. As such, teeth 110 are in a disengaged position. In FIG. 5A, pin 116 is shown disposed within a longitudinal section of track 408. In this position, dial 102 is retained within frame 108 and prevented from extending further from frame 108 by the cap of shoulder screw 106 acting against dial base 410. Arrow 504 indicates that to cause the dial to latch, dial 102 is depressed in the direction of arrow 504. With inward movement of dial 102, pin 116 will move longitudinally within track 408 until pin 116 encounters the angled section of track 408. Further inward movement of dial 102 will cause pin 116 to move against the angled section of track 408, which in turn will cause dial 408 to rotate clockwise until pin 116 reaches the right-most (as seen in FIG. 5A) end of track 408. While not shown in FIG. 5A, the motion of guide pin 302 and its associated track is identical to that of pin 116 and track 408 and the description of guide pin 116 and track 408 applies to guide pin 302 and its associated track.

Figure 5B:
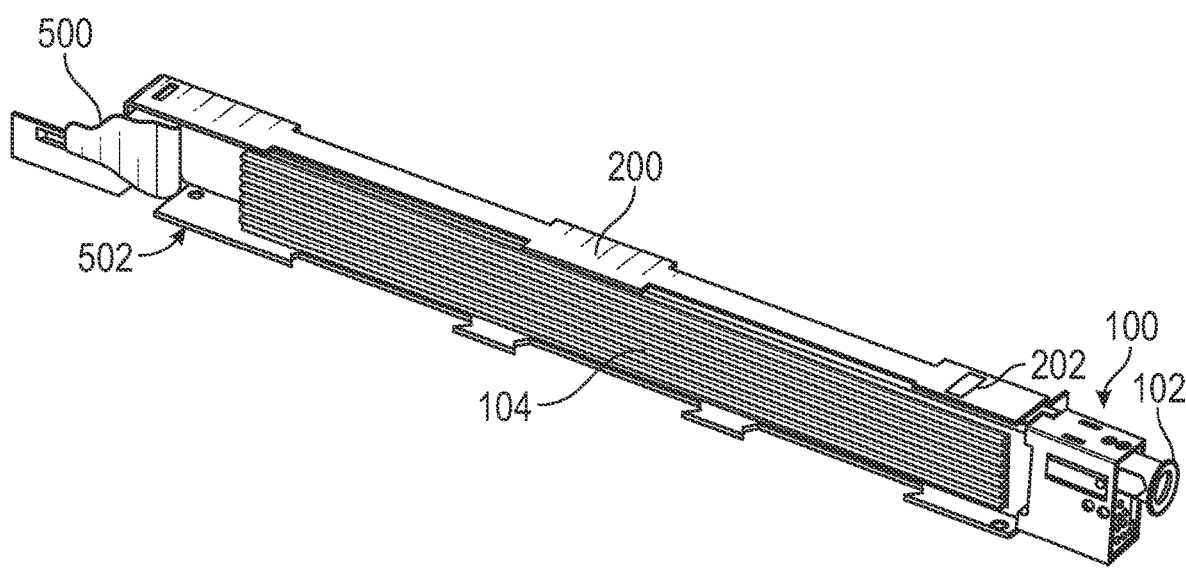
FIG. 5B is a right-side perspective view of the embodiment of FIG. 1A in the unlatched state and attached to an SSD.

FIG. 5B is a right-side perspective view of latch 100 in the unlatched state shown in FIG. 5A and attached to an exemplary electronic component, SSD 104. In FIG. 5B, chassis 200 is shown in incomplete form as a slice of chassis 200 associated with a single SSD 104 and latch 100. Chassis 200 includes a connector 500 for mating with a corresponding connector (not shown) at the end of SSD 104. FIG. 5B illustrates SSD 104 slightly withdrawn from chassis 200 such that there is a space 502 between connector 500 and SSD 104. Latch 100 is also shown to be withdrawn from chassis 200. As a result slot 202 is not aligned with teeth 110. With dial 102 extended, as in FIG. 5A, teeth 110 do not extend from housing 108, which facilitates inserting latch 100 into chassis 200.

Figure 5C:
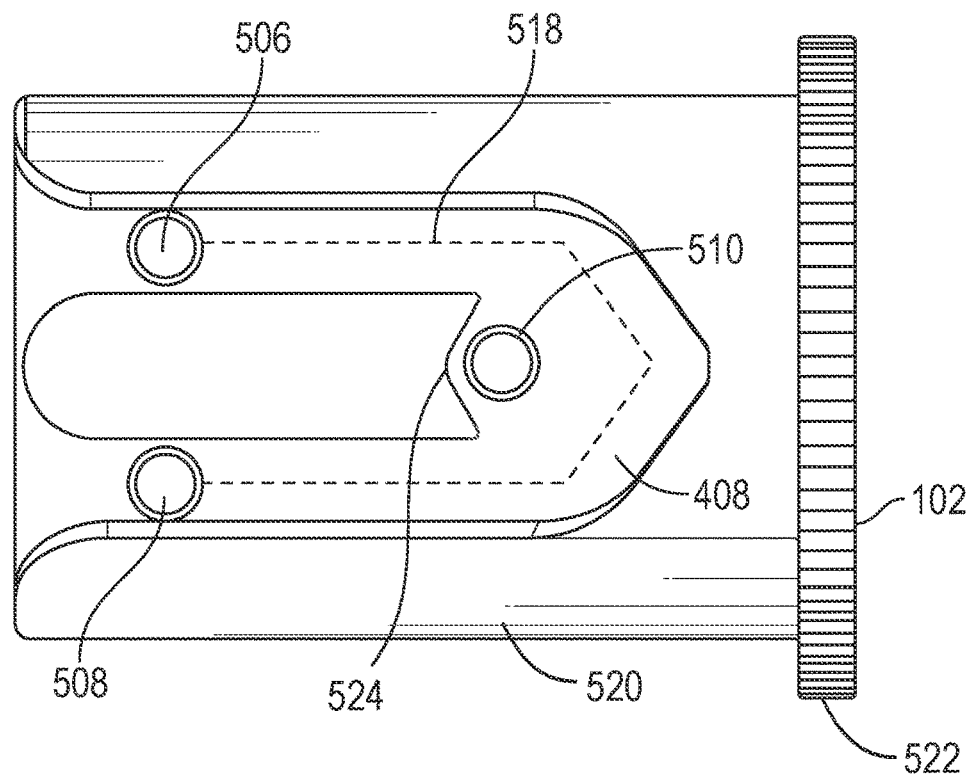
FIG. 5C is right-side view of certain elements of the embodiment of FIG. 1A.

FIG. 5C is right-side view of certain elements of dial 102. In FIG. 5C, guide track 408 is shown in greater detail. In this embodiment, dial 102 includes a cylindrical extension 520 from a knurled edge 522 on the right, with guide track 408 formed into the cylindrical extension. On the opposing side of cylindrical extension 520 is a guide track that is a mirror copy of track 408 and is associated with guide pin 302. The following description of how guide pin 116 may travel within track 408 applies equally to guide pin 302 and its associated track. Guide track 408 is shown formed into the cylindrical extension such that guide pin 116 may travel a path 518 (the dotted line). As dial 102 enters frame 108, guide pin 116 will enter track 408 to the left of location 506. As dial 102 is enters further, guide pin 116 will travel longitudinally along path 518 until path 518 veers downward. Since pin 116 is fixed within frame 108, further leftward motion of dial 102 causes dial 102 to rotate clockwise until pin 116 is positioned at the right-most point of track 408, which is the right-most apex of path 408 between positions 506 and 508. With pin 116 at the right-most point of track 408, further travel of dial 102 to the left and further rotation of dial 102 is resisted. With pin 116 at the right-most point of track 408, and with the release of dial 102, spring 402 will urge dial 102 to the right, causing pin 116 to seat at a catch (or "detent") 524 in track 408 at position 510. With pin 116 seated in catch 524, dial 102 is held in the retracted position. From the retracted position, a slight movement of dial 102 to the left, and a slight rotation in either direction will position pin 116 such that it may subsequently move longitudinally within track 408 to either position 506 or 508. This longitudinal travel returns dial 102 to the extended position.

One should note that not all of the detail discussed with respect to dial 102 and track 408 of FIG. 5C is necessary in all embodiments. In embodiments, dial 102 may include less than the full cylindrical extension 520, less than two guide tracks, and less than a complete single guide track 408. For example, in an embodiment, dial 102 may include a curved extension extending from knurled edge 522, e.g., half a cylinder or a partial cylinder, with a guide track formed into the curved extension. In other words, in an embodiment, the curved extension may include only a portion of the cylinder seen in FIG. 5C sufficient to form and support a guide track and cause leaf spring 404 to deform (as discussed below), and without a corresponding second guide track. In an embodiment, the guide track may allow a guide pin to move between two locations rather than three, e.g., between location 506 corresponding to the extended dial position and location 510 corresponding to the retracted, latched dial position. In other words, position 508 and the associated longitudinal section may not necessarily be present in an embodiment.

In embodiments, the track acts as cam in the sense that linear motion of dial 102 is turned into rotary motion by the pin following and being guided by the track.

Figure 5D:
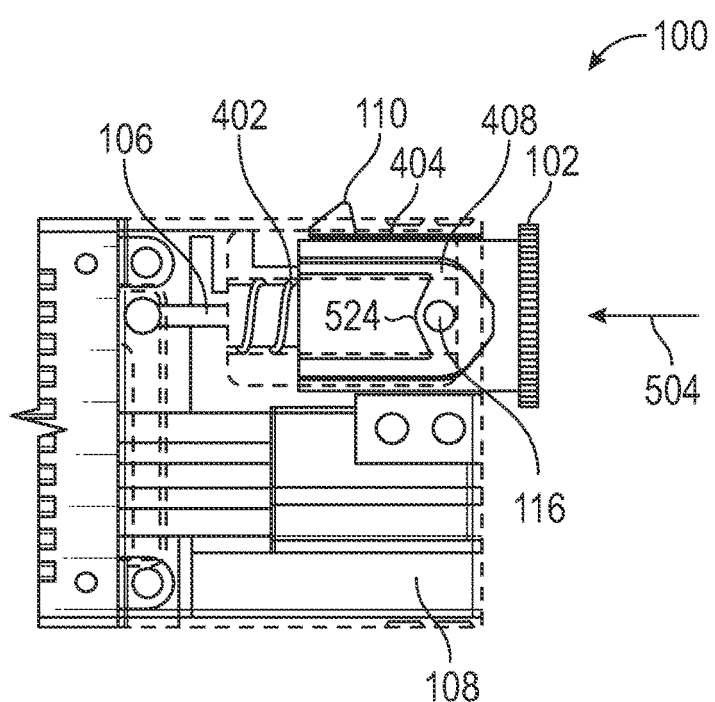
FIG. 5D is a partially-transparent right-side view of the embodiment of FIG. 1A in a latched state and illustrating a manipulation of the embodiment.

FIG. 5D is a partially-transparent right-side view of latch 100 in a latched state and illustrating a manipulation of the embodiment. In FIG. 5D, in comparison to FIG. 5A, dial 102 has been depressed in the direction of arrow 504, causing pin 116 to move laterally within track 408 and cause dial 102 to rotate clockwise until pin 116 is aligned with catch 524. The release of dial 102 then caused spring 402 to urge dial 102 to the right and seat pin 116 within catch 524, which is the arrangement shown in FIG. 5D. With movement of dial 102 to the left, cylindrical extension 520 has come into contact with the previously-angled section of leaf spring 404, causing leaf spring 404 to deform and flatten, and causing teeth 110 to extend above the surface of frame 108. As such, teeth 110 are in an engaging position, e.g., capable of engaging an edge of window 202. With dial 102 in the retracted position, cylindrical extension 520 supports leaf spring 404 and teeth 110 and resists pressure against teeth 110 that might otherwise cause teeth 110 to recede within frame 108 and latch 100 to fail.

Figure 5E:
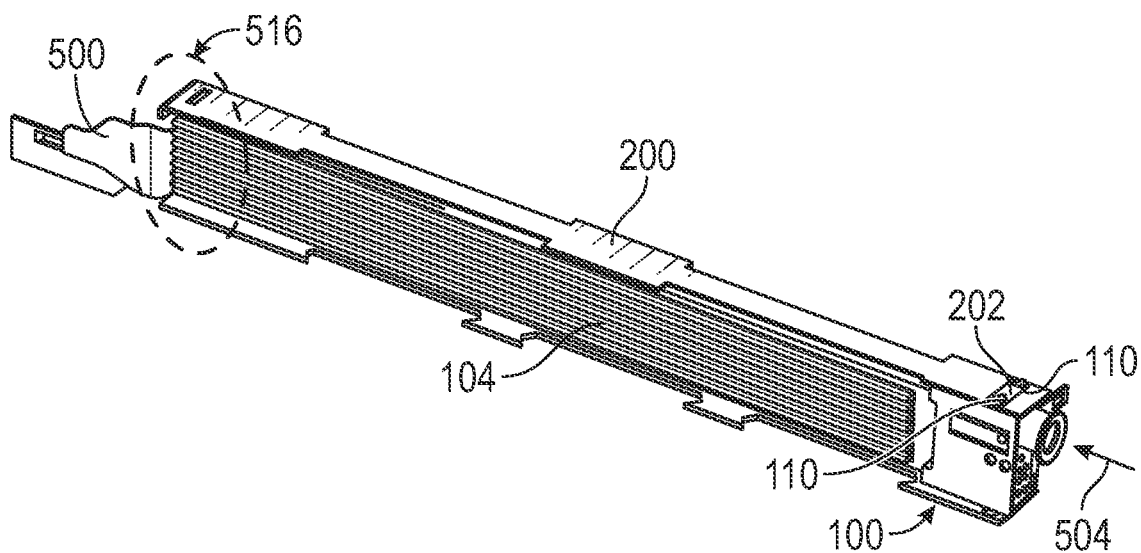
FIG. 5E is a right-side perspective view of the embodiment of FIG. 1A in the latched state attached to an SSD and illustrating a manipulation of the embodiment.

FIG. 5E is a right-side perspective view of latch 100 in the latched state shown in FIG. 5D and attached to the exemplary electronic component, SSD 104. In FIG. 5B, connector 500 is shown mated to the corresponding connector of SSD 104, with area 516 indicating the mating and also the elimination of space 502. FIG. 5E illustrates SSD 104 fully inserted into chassis 200. Latch 100 is also shown to be fully inserted into chassis 200. As a result slot 202 is aligned with teeth 110. With dial 102 retracted, as in FIG. 5D, teeth 110 extend from housing 108 through slot 202, which retains latch 100 and SSD 104 within chassis 200.

In an embodiment, spring 402 is sized to facilitate and indicate the proper mating of connector 500 with the exemplary electronic component, SSD 104. In the embodiment, connector 500 is known to require a threshold force to properly mate to the corresponding connector of SSD 104. To ensure that this connection is properly made, spring 402 is sized so that it requires more than the threshold force to be moved from the extended position of FIG. 5A to the retracted position of FIG. 5D. In an embodiment, spring 402 may be further sized so that with dial 102 in the extended position, spring 402 is compressed to a point that for dial 102 to be moved from the extended position at all, a force greater than the threshold connection force must be exerted against dial 102. In other words, in an embodiment, dial 102 will not move from the extended position until a force greater than the threshold force is applied. Thus, a user may slide SSD 104 into chassis 200, apply force (less than the threshold) to dial 102 to move SSD 104 back into just contacting (but not mating with) connector 500 without causing dial 102 to move from the extended position. Then, by applying a force to dial 102 that is above the threshold force, the user mates connector 500 to SSD 104 with the movement of dial 102 from the extended position to the retracted position being a positive indication that a proper mating force was applied. In addition, by keeping dial 102 at the extended position until SSD 104 is properly connected, cylindrical extension 520 is prevented from coming into contact with the angled part of leaf spring 404 before teeth 110 are aligned with slot 202. For teeth 110 to be forced upward before SSD 104 is properly connected would cause teeth 110 to rub against chassis 200, which may cause unnecessary wear or damage to teeth 110 or leaf spring 404. In the embodiment, after SSD 104 is properly connected to connector 500, and teeth 110 are properly aligned with slot 202, a force applied to dial 102 that is greater than the threshold force will cause cylindrical extension 520 to move against and deform leaf spring 404, in turn causing teeth 110 to extend through slot 202 and latch 100 to close.

Figure 5F:
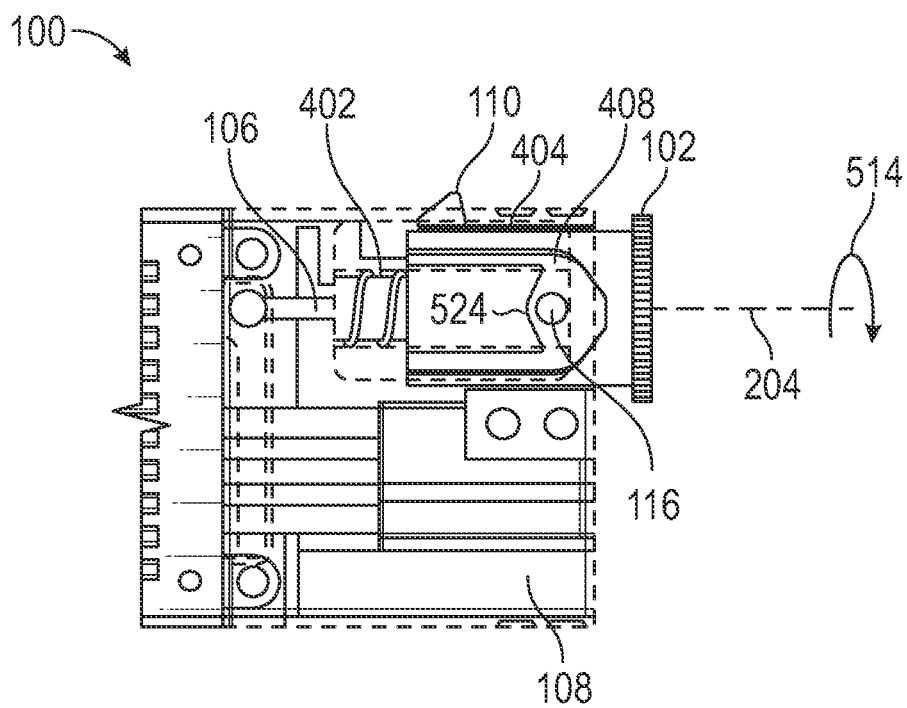
FIG. 5F is a partially-transparent right-side view of the embodiment of FIG. 1A in the latched state and illustrating a manipulation of the embodiment.

FIG. 5F is a partially-transparent right-side view of the latch 100 in the latched state and illustrating a manipulation of the embodiment. FIG. 5F illustrates a step in the unlatching of latch 100 in which dial 102 is depressed slightly and rotated counterclockwise 514 to unseat pin 116 from catch 524 and align pin 116 with a longitudinal section of track 408. One will realize that either clockwise or counterclockwise would be acceptable considering track 408 has longitudinal sections on either side of catch 524. Also, in an embodiment, track 408 may have only a single longitudinal section. As a result, the embodiment would require a rotation in a specific direction to unseat pin 116 from catch 524.

Figure 5G:
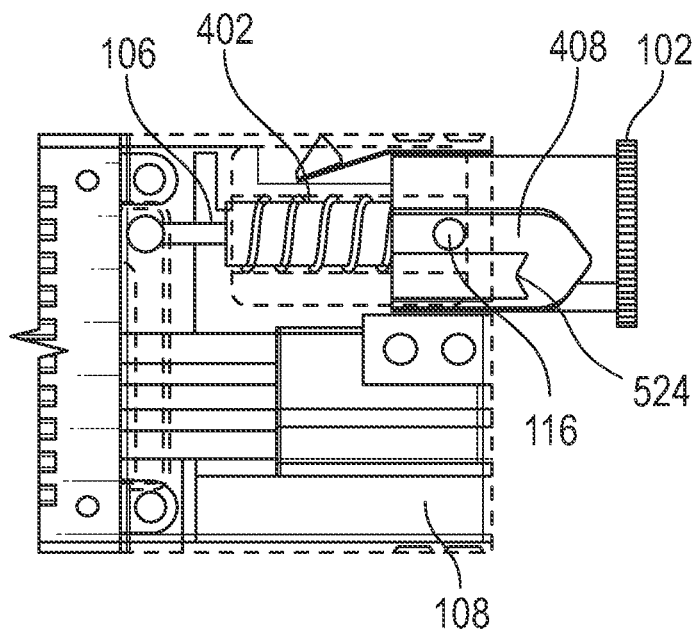
FIG. 5G is a partially-transparent right-side view of the embodiment of FIG. 1A in the unlatched state and illustrating the manipulation of the embodiment.

FIG. 5G is a partially-transparent right-side view of latch 100 in the unlatched state after dial 102 has been rotated as discussed with respect to FIG. 5F, with the subsequent release of dial 102. After pin 116 is unseated (as described with regard to FIG. 5F) and aligned with a longitudinal section of path 408 (as shown in FIG. 5G), removing the force from dial 102 allows spring 402 to urge dial 102 and cylindrical section 520 to the extended position. This removes the support of cylindrical section 520 from behind teeth 110, which in turn allows leaf spring 404 to return to the relaxed state and teeth 110 to recede within frame 108. In short, FIG. 5G shows latch 100 open or unlatched.

Figure 5H:
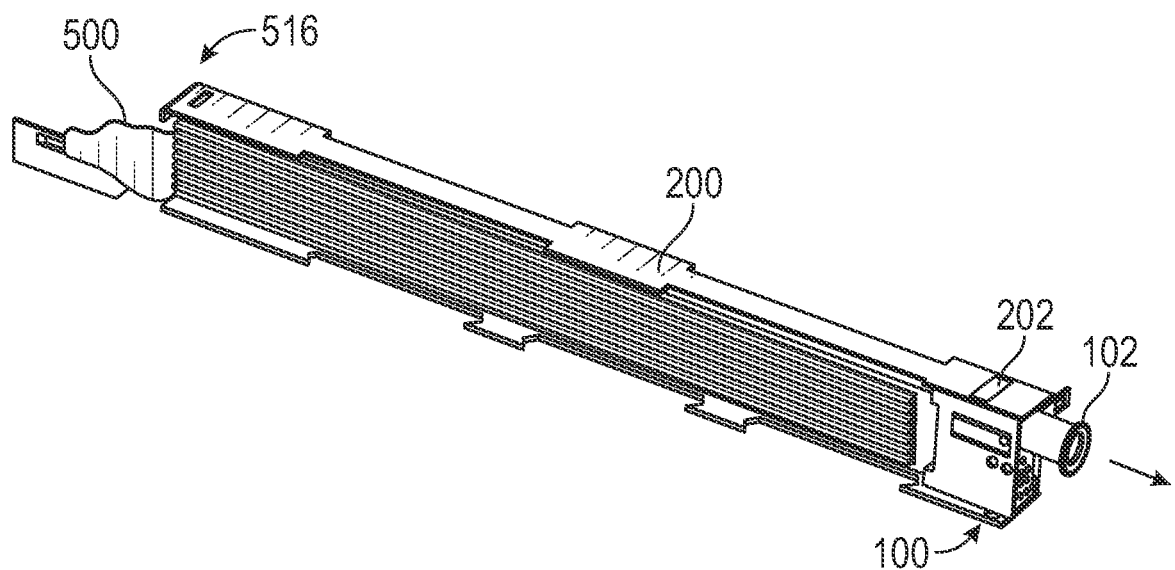
FIG. 5H is a right-side perspective view of the embodiment of FIG. 1A in the unlatched state and illustrating a manipulation of the embodiment.

FIG. 5H is a right-side perspective view of latch 100 in the unlatched state shown in FIG. 5G and attached to an exemplary electronic component, SSD 104. In FIG. 5H, connector 500 is shown mated to the corresponding connector of SSD 104, with area 516 indicating the mating and also the elimination of space 502. FIG. 5H illustrates SSD 104 fully inserted into chassis 200. Latch 100 is also shown to be fully inserted into chassis 200. However, with dial 102 extended and teeth 110 receded within frame 108 and not engaging window 202, latch 100 is unlatched. As a result, dial 102 may be used to pull SSD 104, disconnecting it from connector 500, and removing it from chassis 200.

Thus, in embodiments, because simply pushing dial 102 may cause it to rotate so that pin 116 becomes properly aligned to engage catch 524, embodiments may be considered to have a push-to-trigger or rotate trigger feature.

In embodiments, a feature of the tooth or teeth being retracted within the frame when the latch is unlatched and the dial extended is that the teeth are hidden inside the frame, keeping them from grabbing things, e.g., exposed cables.

In embodiments, a feature of the cylindrical extension being behind the leaf spring when the latch is closed is that the support of the cylindrical extension helps the latch remain latched despite harsh loads, such as those generated during transportation or by seismic activity. In an embodiment, the cylindrical extension may deform the leaf spring enough to cause the teeth to emerge to the engaging position without the cylindrical extension moving into position below (or behind) the teeth. In this embodiment, the latching power of the teeth would rely on the stiffness of the leaf spring.

In embodiments, a feature of the leaf spring is its small size, which leaves more space for the dial and track mechanism and for the grate providing cooling air to the exemplary electronic component, SSD 104.

In embodiments, dial 102 (and knurled edge 522 and cylindrical extension 520) may be injection molded.

In an embodiment, a feature of the dial is that a push is required to latch the dial, while a rotation is required to release the dial. Thus, the two different gestures help avoid a false triggering of the latch into an undesired state.

In an embodiment, the frame may be die-cast and the dial (knurled edge, cylindrical extension, and track) may be die-cast. In an embodiment, the force of spring 402 in the threshold compressed state may be 8 lbs. Thus, a connection force of 8 lbs would be applied before dial 102 moves from the extended position to the retracted position and teeth 110 emerge to the engaging position.

The previous description is provided to enable any person skilled in the art to practice the various aspects described herein. In the embodiments, the separation of various system components in the embodiments described above should not be understood as requiring such separation in all embodiments. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims.

What is claimed is:

1. An apparatus comprising:
a frame including a first retaining pin;
a dial including a curved extension, the dial rotatable about an axis with respect to the frame, and movable along the axis to a retracted position and to an extended position with respect to the frame, the curved extension being curved about the axis and including a first catch corresponding to the retracted position;
a spring urging the dial toward the extended position;
a tooth attached to a leaf spring, the leaf spring attached to the frame and configured such that when the leaf spring is in a relaxed state the tooth is in a recessed position, wherein:
movement of the dial from the extended position to the retracted position causes the curved extension to deform the leaf spring, causing the tooth to move from the recessed position to an engaging position;
the first retaining pin when engaged with the first catch reversibly maintains the dial in the retracted position; and
movement of the dial from the retracted position to the extended position lessens the deformation of the leaf spring caused by the curved extension, causing the tooth to move from the engaging position to the recessed position.

2. The apparatus of claim 1 further comprising:
a first track in the curved extension, the first track including a first track section and a second track section, the second track section including a first track edge angled with respect to the first track section, wherein:
in the extended position the curved extension is received partly into the frame;
with movement of the dial from the extended position to the retracted position the curved extension is received further into the frame and the first retaining pin moves within the first track and causes a partial rotation of the dial when the first retaining pin moves against the first track edge; and
the first catch is disposed within the second track section such that, when the first retaining pin is disposed at an end of the first track edge, a movement of the dial toward the extended position seats the first retaining pin in the first catch.

3. The apparatus of claim 2, wherein:
the curved extension includes a cylindrical element extending from the dial;
the first track includes the first track section and a third track section joined by the second track section, the first and third track sections disposed longitudinally on the cylindrical element, the second track section disposed between first and third track sections, the second track section including a second track edge angled with respect to the third track section, and
the first catch is disposed within the second track section such that, when the first retaining pin is disposed at an intersection of the end of the first track edge and an end of the second track edge, a movement of the dial toward the extended position seats the first retaining pin in the first catch.

4. The apparatus of claim 3 further comprising:
a second track identical to the first track and disposed on the cylindrical element rotated 180 degrees from the first track about the axis;
a second retaining pin disposed on the frame to engage the second track in the same manner as the first retaining pin engages the first track.

5. The apparatus of claim 1, wherein the retracted position is maintained by the first retaining pin being positioned within the first catch and held within the first catch by the spring urging the dial toward the extended position.

6. The apparatus of claim 1, the apparatus further comprising:
a projection connected to the frame, wherein:
the dial includes an axial space defined by the curved extension;
the spring includes a coil spring about the projection;
the projection is received within the axial space with movement of the dial from the extended position to the retracted position; and
movement of the dial from the extended position to the retracted position compresses the coil spring.

7. The apparatus of claim 6, wherein the projection includes a cylinder with a cap configured to retain the dial.

8. The apparatus of claim 1, wherein the curved extension is cylindrical about the axis.

9. The apparatus of claim 1, wherein with the dial in the retracted position the curved extension is in contact with the leaf spring behind the tooth.

10. The apparatus of claim 1, wherein the leaf spring includes a first spring section and a second spring section at an angle to the first spring section in the relaxed state, the first spring section attached to the frame between the frame and the curved extension, movement of the dial from the extended position to the retracted position causing the curved extension to contact the second spring section and deform the leaf spring, the curved extension being behind the tooth when the dial is in the retracted position.

11. The apparatus of claim 1, wherein, with the dial in the extended position, the spring is compressed to a threshold spring force.

12. The apparatus of claim 11 further comprising a connector with a connection force, wherein the threshold spring force is greater than the connection force.

13. A method comprising:
  inserting an electronic component into a chassis having a latch window and a first connector at the rear of the chassis, the electronic component having a second connector and a latch, the first connector and the second connector having a mating force, the latch including:
    a frame including a first retaining pin;
    a dial including a curved extension, the dial rotatable about an axis with respect to the frame, and movable along the axis to a retracted position and to an extended position with respect to the frame, the curved extension being curved about the axis and including a first catch corresponding to the retracted position;
    a spring urging the dial toward the extended position;
    a tooth attached to a leaf spring, the leaf spring attached to the frame and configured such that when the leaf spring is in a relaxed state the tooth is in a recessed position, wherein:
  movement of the dial from the extended position to the retracted position causes the curved extension to deform the leaf spring, causing the tooth to move from the recessed position to an engaging position;
  the first retaining pin when engaged with the first catch reversibly maintains the dial in the retracted position; and
  movement of the dial from the retracted position to the extended position lessens the deformation of the leaf spring caused by the curved extension, causing the tooth to move from the engaging position to the recessed position;
  bringing the first connector into proximity to the second connector for mating; and
  forcing the dial from the extended position to the retracted position, wherein:
    the forcing causes the electronic component to move further into the chassis and the first connector and the second connector to mate without causing the dial to move to the retracted position,
    after the electronic component moves further into the chassis, the forcing causes the dial to move from the extended position to the retracted position indicating that the mating force has been exceeded, and
    the motion of the dial from the extended position to the retracted position causes the tooth to move to the engaging position and engage the latch window, securing the electronic component within the chassis.

* * * * *